United States Patent [19]

Dedrick

[11] Patent Number: 5,768,521

[45] Date of Patent: Jun. 16, 1998

[54] GENERAL PURPOSE METERING MECHANISM FOR DISTRIBUTION OF ELECTRONIC INFORMATION

[75] Inventor: Rick Dedrick, Hillsboro, Oreg.

[73] Assignee: Intel Corporation, Santa Clara, Calif.

[21] Appl. No.: 597,466

[22] Filed: Feb. 2, 1996

Related U.S. Application Data

[63] Continuation of Ser. No. 243,845, May 16, 1994, abandoned.

[51] Int. Cl.$^6$ .......................... G06F 13/00; G06F 153/00
[52] U.S. Cl. ............................. 395/200.54; 395/200.47; 705/32; 705/400
[58] Field of Search ................ 380/4, 25; 395/200.06, 395/200.12, 200.02, 200.04, 200.13, 200.54, 200.57, 200.79, 200.36, 200.62, 200.47, 200.48, 200.49; 364/464; 705/400, 412, 32; 707/10

[56] References Cited

U.S. PATENT DOCUMENTS

| | | | |
|---|---|---|---|
| 4,429,385 | 1/1984 | Cichelli et al. | 370/92 |
| 4,532,554 | 7/1985 | Skala . | |
| 4,695,880 | 9/1987 | Johnson et al. . | |
| 4,827,508 | 5/1989 | Shear | 380/4 |
| 4,850,007 | 7/1989 | Marino et al. . | |
| 4,868,758 | 9/1989 | Kokubu . | |
| 4,912,552 | 3/1990 | Allison, III et al. | 379/92 |
| 4,977,594 | 12/1990 | Shear | 380/4 |
| 4,992,940 | 2/1991 | Dworkin . | |
| 5,050,213 | 9/1991 | Shear | 380/25 |
| 5,144,663 | 9/1992 | Kudelski et al. . | |
| 5,155,591 | 10/1992 | Wachob . | |
| 5,162,989 | 11/1992 | Matsuda . | |
| 5,220,501 | 6/1993 | Lawlor et al. . | |
| 5,237,157 | 8/1993 | Kaplan . | |
| 5,247,575 | 9/1993 | Sprague et al. . | |
| 5,267,171 | 11/1993 | Suzuki et al. . | |
| 5,283,731 | 2/1994 | Lalonde et al. . | |
| 5,305,195 | 4/1994 | Murphy . | |
| 5,319,455 | 6/1994 | Hoarty et al. . | |
| 5,321,740 | 6/1994 | Gregorek et al. . | |
| 5,339,239 | 8/1994 | Manabe et al. . | |
| 5,386,369 | 1/1995 | Christiano | 364/464.01 |
| 5,408,519 | 4/1995 | Pierce et al. . | |
| 5,410,598 | 4/1995 | Shear | 380/4 |
| 5,412,416 | 5/1995 | Nemirofsky . | |
| 5,414,837 | 5/1995 | Kotatsu | 395/200.49 |
| 5,418,713 | 5/1995 | Allen | 705/32 |
| 5,446,919 | 8/1995 | Wilkins . | |
| 5,666,645 | 9/1997 | Thomas et al. | 395/200.47 |

OTHER PUBLICATIONS

Lexis–Nexis, "Session Software: For the Macintosh Computer ver. 1.51 User's Guide", 1991, pp. 23–37.
"Dialog on Disc", User Guide, 1992, Chap 1,2,5,6,7 and Indexs C,D,E.

*Primary Examiner*—Mark H. Rinehart
*Attorney, Agent, or Firm*—Blakely, Sokoloff, Taylor & Zafman

[57] ABSTRACT

A computer network system that contains a metering mechanism which can meter the flow of electronic information to a client computer within a network. The information can be generated by a publisher and electronically distributed to a plurality of metering servers which each contain the metering mechanism. The metering servers each reside in a local area network that contains a number of client computers. The client computers each contain a graphical user interface that allows an end user to request consumption of the information. The metering mechanisms control the transfer of information into the client computers. Each unit of information has an associated cost type and cost value that are used to calculate a price for the information. When the end user request consumption of information, the metering mechanism determines whether the end user can consume the information. If the end user can access the information, the meter will transfer the information to the end user and charge the price of the information to an electronic account of the end user stored in a database of the metering server. The metering mechanism can periodically transfer the balance of the account, and the charges associated with the account to a billing database that resides in a regional server which automatically generates a bill for the end user.

47 Claims, 8 Drawing Sheets

GENERAL PURPOSE METERING MECHANISM FOR DISTRIBUTION OF ELECTRONIC INFORMATION

This is a continuation application of application Ser. No. 08/243,845, filed May 16, 1994, now abandoned.

BACKGROUND OF THE INVENTION

1. Field of the Invention

The present invention relates to a computer network that meters information distributed to client computers within the network.

2. Description of Related Art

Computers are commonly coupled together to create a computer network. The network allows information such as electronic mail to be transferred between computers. Some networks contain a dedicated computer, commonly referred to as a server, which operates the network and runs other applications such as a modem sharing program. The server and shared modem can link the client computers of the network to a client database which resides at a remote location. For example, the text of a magazine or newspaper article can be found in the database provided by Mead Data Central, Inc. under the trademark NEXIS®. To find an article within the NEXIS® database, the user initially becomes linked with the database through a modem. The NEXIS® system includes a graphic user interface (GUI) which provides fields that allow the user to search and find the article of interest. The NEXIS® system also allows the user to print, save in memory, or otherwise consume the information at the client computer location.

The providers of content databases typically charge the user for accessing the database. By way of example, the provider may have an initial hook up charge when the user connects with the system, and then subsequent charges for each minute that the user has access to the database. Alternatively, the database provider may charge for each search within the content database, or each time the user accesses a different library within the database and so forth an so on.

Subscribing to a remote content database typically requires establishing an account with the database publisher. Establishing a database account may include filling out a form and mailing the same to the publisher. Once the account is established, the publisher may mail literature relating to new databases. To obtain access to the new database the end user must again contact the publisher, typically by telephone or by filling out another form. It would be desirable to have a system that would provide the end user with the ability to subscribe to a database of information directly from the screen of the user's computer. It would also be desirable to have a system that would automatically debit and bill the user for consuming information from the database. Additionally, it would be desirable to provide a system that would allow publishers of electronic information to generate and electronically distribute such information for consumption by the end users.

SUMMARY OF THE INVENTION

The present invention is a computer network server system that contains a metering mechanism which can meter the flow of electronic information to a client computer within a network. The information can be generated by a publisher and electronically distributed to a plurality of metering servers which each contain the metering mechanism. Each metering server resides in a local area network that contains a number of client computers. The client computers each contain a graphical user interface that allows an end user to request consumption of the information. The metering mechanisms control the transfer of information into the client computers.

Each unit of information has an associated cost type and cost value that are used to calculate a price for the information. The cost may be pay per view, pay per byte, pay per time, etc. When the end user requests consumption of information, the metering mechanism determines whether the end user can consume the information. By way of example, the metering mechanism may calculate a price of the information and subtracts the price from a balance in an end users electronic account stored in a database within the metering server. If the result is greater than zero, the metering mechanism will transfer the information to the end user and charge the price to the end user's account. The metering mechanism can periodically transfer the balance of the account, and the charges associated with the account to a billing database that resides in a clearinghouse server which automatically generates a bill for the end user.

BRIEF DESCRIPTION OF THE DRAWINGS

The objects and advantages of the present invention will become more readily apparent to those ordinarily skilled in the art after reviewing the following detailed description and accompanying drawings, wherein:

FIGS. 5a-c are flow diagrams that show a unit of information consumed by an end user;

DETAILED DESCRIPTION OF THE INVENTION

Figure 1:
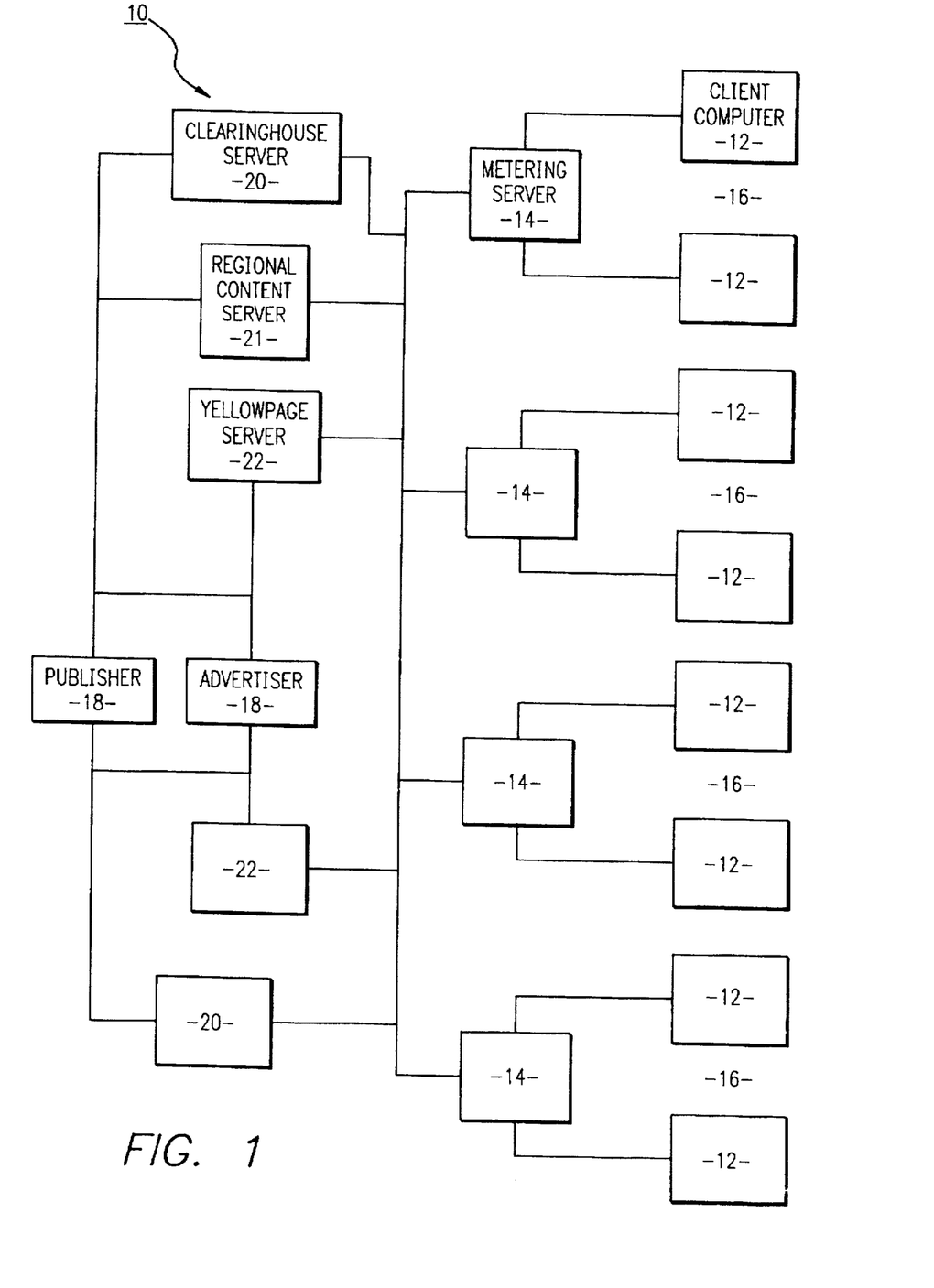
FIG. 1 is a schematic of a network of the present invention.

Referring to the drawings more particularly by reference numbers, FIG. 1 shows a network system 10 of the present invention. The network 10 includes a plurality of client computers 12 coupled to a metering server 14 within a local area network (LAN) 16. Each client computer 12 may be a personal computer that is operated by an end user. The server 14 is typically a dedicated computer that provides an interconnect contact node which allows the client computers 12 to communicate with the server 14 and other client computers 12. The server 14 may contain resident modem sharing software that allows the server 14 and client computers 12 to communicate with a device external to the local network 16. The server is also capable of maintaining resident databases. Both the server 14 and the client computers 12 contain the necessary interface hardware and software required to transfer information between the components of the system 10.

The metering server 14 is coupled to a publisher unit 18 through a plurality of clearinghouse servers 20. By way of example, the publisher 18 may be connected to the server 14 as part of an overall wide area network (WAN) that allows the server 14 and publisher unit 18 to transfer information. The system 10 may also have a yellow page server 22 coupled to the publisher unit 18 and the metering servers 14. The publisher unit and servers of the WAN system contain the interface hardware and software necessary to transfer electronic information between the components of the system. As shown in FIG. 1, the system 10 may have multiple client computers 12 coupled to a single metering server 14 and multiple servers 14 coupled to a single clearinghouse server 20, a regional content database server 21 and a single yellow page server 22. There may be multiple clearinghouse and yellow page servers located at regional centers through the country/world. Although the computer 18 is referred to as a publishing unit, it is to be understood that the computer can also be a node for an advertiser 18 and that the use of the terms publisher and advertiser may be synonymous.

Each client computer 12 is provided with a graphic user interface (GUI) that allows the end user to participate in the system 10. The GUI will contain fields that receive or correspond to inputs entered by the end user. The fields may include the user's name and possibly a password. The GUI may also have fields relating to demographic, psychographic and other profile information such as age, sex, income, employer, job title, mailing address, phone number, personal and business areas of interest, the willingness to participate in a survey, along with various lifestyle information. This information will be referred to as user profile data. The end user enters the requested data and the information is transferred to the metering server 14. The GUI also allows the user to receive inquiries, request information and consume information by viewing, storing, printing, etc. The client computer may also be provided with tools to create content, advertisements, etc. in the same manner as a publisher/advertiser.

Figure 2:
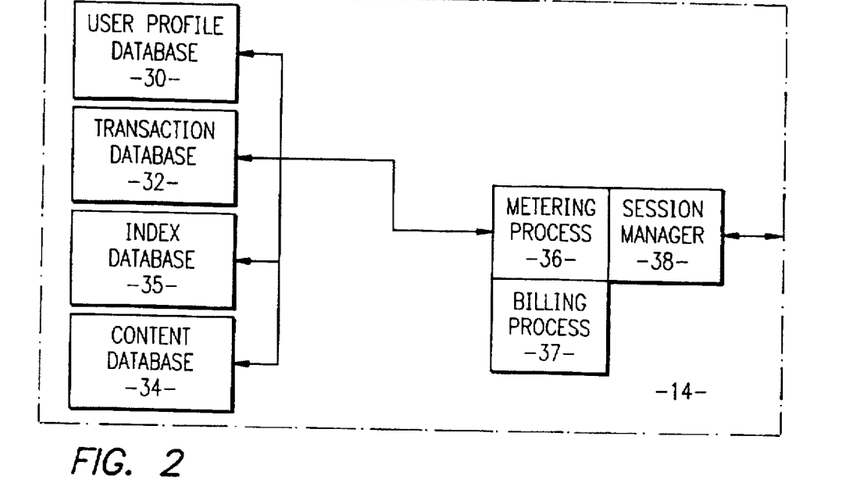
FIG. 2 is a schematic of a metering server.

As shown in FIG. 2, resident within each metering server 14 is a user profile database 30, a transaction database 32, a content database 34 and an index database 35. The user profile database 30 contains demographic and psychographic data (income, age, etc.) of the end users, along with subscriber information. The transaction database 32 contains the end user's account along with a log of the transaction, including the price of the transaction and the type of information consumed. The transaction database 32 may also contain the balance and a credit limit for each end user account. The content database 34 contains units of electronic information. The index database 35 contains titles for each electronic information unit. The metering servers 14 may also have access to a regional content database server(s) 21 which contains a larger content database.

Each metering server 14 also contains a metering process 36, a billing process 37 and a session manager 38. The metering 36 and billing 37 processes access and process information in response to instructions from the session manager 38. For example, when an end user requests a unit of information, the request is received by the session manager 38. The session manager 38 instructs the metering process 36 to retrieve the requested unit of information. The metering process 36 may then initially access the user profile database 30 to determine whether the end user is a subscriber of the information. If the end user is a subscriber, the metering process 36 will retrieve the unit of requested information from the content database 34, wherein the information can be transmitted to the end user.

If the end user is not a subscriber, the metering process 36 will calculate the price of the requested information and access the transaction database to subtract the price from the balance of the end user's account. The balance is initially established when the end user requests an account in the system. The balance may be specified by the end user and approved by the clearinghouse server. Approval may be based upon a credit card number or bank account number provided by the end user. The balance may be updated by the clearinghouse server when the end user pays his bill. If the balance minus price is greater than zero, the metering process 36 will retrieve the information and send the same to the end user. If the balance minus price is less than zero, the metering process 36 will not retrieve the information and may send a message to the end user that the balance has been exceeded. The initial balance of the account is typically set by a credit limit.

By way of another example, a clearinghouse server 20 may request billing information from the metering server 14 about the end users, or a specific end user. The session manager 38 receives the request and instructs the billing process 37 to retrieve the information. The billing process 37 then retrieves the billing information from the transaction database 32 and transfers the information to the clearinghouse server 20. The clearinghouse server 20 may request user profile data, wherein the billing process 37 retrieves the profile data from the user profile database 30. Additionally, the information may be targeted to end users with specific profiles. Upon receiving and storing the targeted information in the content database 34, the metering process 36 will access the user profile database 30 to find end users with matching profiles. The metering process 36 then sends the content titles to the end users with matching profiles.

The publisher/advertiser 18 is provided with software tools to create electronic information which includes content and advertisements, that can be transmitted over the system. The electronic information may allow an end user to access a content database, or the information may be all or a portion of a content database. By way of example, the content database may be the text and video of an electronic newspaper. The content database may reside within the publisher unit or be located at a remote location such as the metering server or a regional server that services a plurality of metering servers. The software tools may include a hypertext oriented mark up language that routes distributed end user to the content databases.

The software tools may also provide an interactivity builder to allow the end user to interact with the electronic information. For example, the electronic information may be a content database that is analogous to the "yellow pages" of a phone book. The yellow page content database may contain a plurality of advertisements that can be viewed by the end user. The software tools may allow the publisher to build an object that allows the end user to search the contents of the content database. The software tools may also allow the publisher/advertiser to combine different types of information. For example, the publisher can combine video, audio, graphics, animation and text all within the same unit of electronic information provided to the end user.

The software tools include "cost type" and "cost value" fields that accompany each unit of electronic information. The cost type and cost value can be utilized to calculate a price that can be either credited or debited from the end users. The fields allow the publisher/advertiser 18 to establish the manner in which the information will be charged to the end user's account. One example of a cost type is "pay per view" payment method, wherein the end user pays an associated cost each time the user consumes a unit of information. This type of payment may be desirable for information which is typically seldom consumed by the end user. Other cost types include payment on a per byte or word of information viewed by the end user, or payment for the period of time that the user consumes the information. These cost types may be desirable when the end user is accessing a database that contains, for example, corporate or individual credit information, or the drawings and text of a patent database.

The user may also subscribe to units of information, either individually, or through a group such as the employer of the end user. For example, the end user may wish to subscribe to a news database that provides the end user news information upon command for a monthly, yearly, etc. charge. The cost types may also include a one-time charge for a unit of information, wherein the end user is granted access to the unit of information for the life of the unit.

The cost types may be provided as part of a menu that can be selected by the publisher. For example, the menu may appear to the publisher as follows:
"Pay Per View"
"Pay Per Byte"
"Pay Per Time"
. . . "

The cost value is provided in a different field and may be embodied by a simple data entry by the publisher. For example, if the pay per view cost type is selected, the publisher may enter "$1.00". If the pay per byte cost type is selected, the publisher may enter "$0.10 per Mbyte", and so forth and so on. The tools may also allow the publisher to associate a plurality of cost types and corresponding cost values with the same content of information.

In addition to debit models, the software tools may also allow the publisher/advertiser 18 to build a credit model which credits the end users account each time the user views a unit of information. This model is particularly useful for advertisers who may want to credit the end user's account to encourage the user to consume an advertisement. By way of example, the credit model can be used in association with the yellow pages content database. The publisher/advertiser may also be provided with a field that allows the publisher/advertiser to select between credit and debit.

The software tools may allow the publisher/advertiser 18 to request certain profile data associated with the consumption of a unit of information. For example, associated with a unit of information may be a request to provide the publisher/advertiser with certain user profile data such as the age or income of the viewers who viewed the information. Additionally, the tools may also allow the publisher to request that the unit of information be directed only to end users that have a certain profile. For example, the publisher/advertiser may request that a unit of information be directed only to male end users or end user's that have historically viewed news items. The target user profile may be associated with a pricing hierarchy for advertising information, such that a targeted end user receives a larger price credit than an end user that was not targeted by the advertiser.

The publisher/advertiser is also provided with an account number so that the charges associated with the consumption of information provided by the publisher/advertiser is charged to the account number of the publisher/advertiser. For example, a publisher may provide a unit of information which is subsequently consumed by the end user. The charge incurred by the end user is then debited against the user's account and credited to the publisher's account. By way of another example, the end user may view an advertisement, wherein the charge associated with the unit of information viewed is credited to the end user's account and debited to the advertiser's account.

Figure 3:
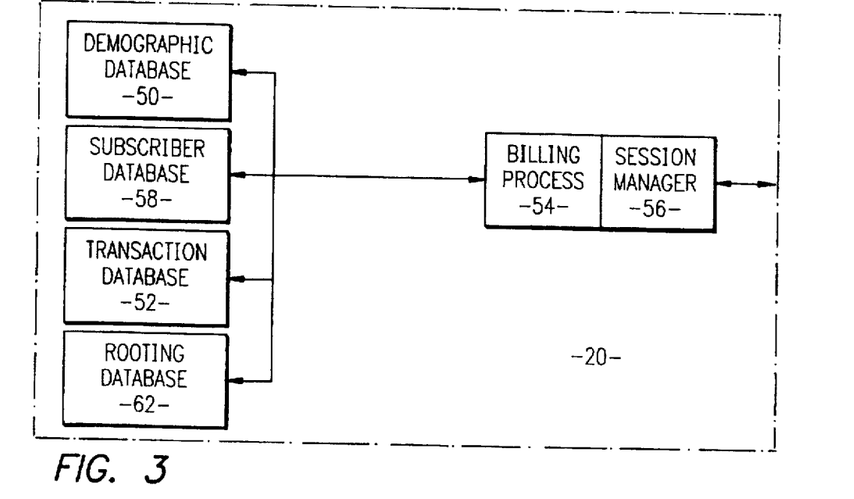
FIG. 3 is a schematic of a clearinghouse server.

As shown in FIG. 3, each clearinghouse server 20 contains a demographic database 50, a transaction database 52, billing process 54 and a session manager 56. The demographic database 50 contains user profile data collected from the metering servers 14. The transaction database 52 contains billing information relating to the end users. The transaction database 52 also contains data relating to the accounts of the publishes/advertisers 18. The billing process 54 can access and process data within the databases 50 and 52. For example, when an end user consumes a unit of electronic information, data relating to the consumption of the electronic information may be sent from the metering server 14 to the clearinghouse server 20. The session manager 56 instructs the billing process 54 to charge the publisher/advertiser account within the transaction database 52. The clearinghouse server 20 may also receive user profile data from the metering servers 14 which is subsequently stored by the billing process 54 in the demographic database 50.

The billing process 54 can also provide the publisher/advertiser 18 with requested user profile data. For example, the publisher/advertiser may send a unit of information along with a request for certain user profile data of the end users who view the information. The clearinghouse server 20 will compile the user profile data of the end users who view the information and forward the compiled user profile data to the publisher.

The billing process 54 of the clearinghouse server can also direct a unit of electronic information to metering servers that service end users with a profile that correlates to a targeted user profile characteristic. For example, the publisher may request that a unit of electronic information be directed to end users with a certain income, etc. The demographic database 50 may contain data relating to which metering servers 14 service end users with corresponding user profile characteristics. The clearinghouse server 20 correlates the requested user profile data with certain identified metering servers and sends the unit of electronic information only to the selected metering servers, which then forward the electronic information to the end users. The clearinghouse server may also have a subscriber database 58 that contains a list of all the metering servers and whether a subscribing end user is associated with the metering server. If the electronic information provided by the publisher is for subscribers, the billing process 54 accesses the subscriber database 58 and provides the information to metering servers that have corresponding subscribers.

The clearinghouse server 20 correlates the demographic data of an end user with a metering server without specifically "knowing" the identity of the end user. This feature increases the privacy of the end user so that an external entity cannot find out the type or content of information being viewed by a specific end user. The clearinghouse server 20 and metering server 14 may also contain access control security features which prevent an illegal access of the databases that reside within the server.

The billing process 54 may also generate bills for the end users and the publishers/advertisers. Upon a request from the publisher/advertiser, the session manager 56 instructs the billing process 54 to generate a bill. The billing process 54 retrieves the billing information from the transaction database 52 and generates a bill. The bill may be electronically transferred to the end user or sent through a conventional mail service. The billing process 54 may also generate bills that are transmitted to the publishers/advertisers. The bill may be generated periodically in accordance with header information that accompanies the content that is generated by a publisher/advertiser.

The clearinghouse server may contain a routing database 62 that contains indexes for access to databases external to the system. The routing database 62 is used to direct access requests to remote databases that do not reside in the metering servers 14.

The clearinghouse server 20 can also credit or debit the publisher/advertiser account for electronic information sent by another publisher/advertiser. For example, advertising information generated by an advertiser and viewed by an end user can be credited to the account of a publisher if the advertising information is associated with electronic information provided by the publisher. By way of example, the clearinghouse server 20 can replace the conventional billing system between advertisers and publishers that is present in traditional newspaper advertising.

The metering server 14 is capable of storing units of information relating to the content databases of the publisher/advertiser, including the entire content database. The publisher may periodically update the contents of the database. The content may be initially transferred from the publisher/advertiser 18 to the clearinghouse server 20, which retransmits the content to regional 21 and metering 14 servers. The content received by the metering server 14 from the publisher may include content titles that summarily describe the contents and are stored in the index databases 35 of the metering servers 14. The metering server 14 transmits the titles and possibly a portion of the content to the client computers 12. If the end user wants to consume the electronic information, the user generates a request for the electronic information, typically by providing an input to the GUI of the client computer 12. The metering server 14 receives the request and sends the information in accordance with the metering methodology of the system.

When an end user requests electronic information, the metering server 14 calculates the price of consuming the electronic information from the cost type and the cost value associated with the information. By way of example, the metering process 36 subtracts the price from the account balance and then determines whether the result is greater than zero. If the price of consuming the electronic information does not exceed the balance, the metering server 14 sends the unit of electronic information to the end user. If the price does exceed the balance, the metering server 14 will not send the electronic information to the end user and may inform the end user of the remaining balance. If the cost type associated with the information is per time or per byte/word, the metering server may periodically determine if the balance is being exceeded by the consumption of information. The metering server may terminate the transmission of information if the price of the information exceeds the balance. The metering server 14 may also periodically transfer the balance, the charges and the associated billing information of the end user to the clearinghouse server 20 for billing.

The metering server 14 may also transfer requested user profile information to the clearinghouse server 20. For example, the publisher 18 may transfer a unit of information to the metering server 14 via the clearinghouse server 20, along with a request to transmit user profile data associated with the end users who consume the electronic information. When an end user requests information, the metering process 36 associates the information with the account number and user profile data of the user in the user profile database 30. The metering server 14 then sends the user profile data to the clearinghouse server 20 which compiles the data.

Figure 4:
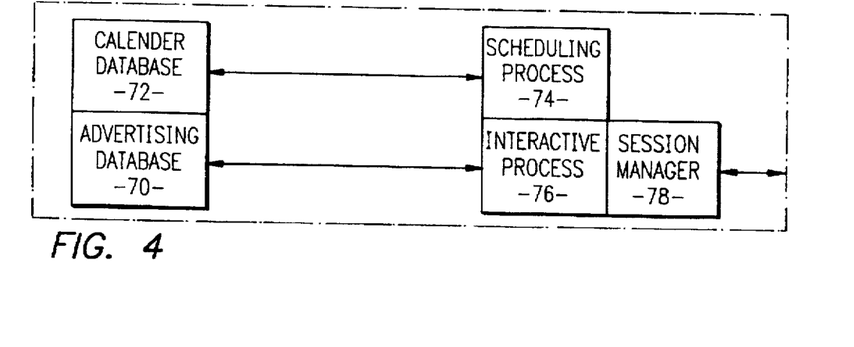
FIG. 4 is a schematic of a yellow page server.

As shown in FIG. 4, the yellow page server 22 contains a resident advertising database 70, a calendar database 72, a scheduling process 74, an interactive process 76 and a session manager 78. The yellow page server 22 receives and stores electronic advertising information from an advertiser 18 in the advertising database 70. The advertising database 70 may contain electronic information that is generated by advertisers or by the end users. By way of example, an end user generated electronic advertisement may be analogous to a "classified ad". To create end user generated advertisements, the client computers may be provided with the same electronic publishing tools as the advertiser. The electronic advertising information typically includes advertising titles. The electronic advertising information may also have header information containing targeted user profile data. The metering process 36 accesses the user profile databases and correlates the targeted user profile data with metering servers that service end users with the targeted profiles. Metering servers with corresponding target profiles are provided with the advertising titles.

The calendar database 72 contains advertiser's scheduling and availability information. For example, an end user/advertiser may generate an advertisement that specifies a service such as lawn mowing. The end user/advertiser may also include an availability schedule within the calendar database 72 which allows an end user who consumes the advertisement to view and request the service at a specified date and time. The scheduling process 74 allows the end user to access the calendar database 72 to view and schedule a time, etc.

Each client computer 12 may have a running cooperative process that provides the advertising information to the end user. The GUI of the client computer may provide a visual or audio indication that an advertising title has been received by the end user computer. The end user can then review the advertising title and request the electronic advertisement if desired. The metering server then retrieves the electronic advertisement from the yellow page server for subsequent transmittal to the end user. Although an electronic advertisement has been described, it is to be understood that a unit of electronic information from a publisher may also be distributed to the client computers 12 in this manner.

Alternatively, the end user may initiate a request of an advertising content database 70 such as a "yellow pages" which is stored in the advertising database of the yellow pages server 22. The interactive process 76 allows the end user to search and view advertisements from a library(s) of ads. The interactive process 76 may allow the end user to answer queries and take alternate paths to external databases. The interactive model may also allow the end user to initiate a query with the advertiser requesting follow-up information.

The metering server 14 in conjunction with the cooperative process of the client computer may monitor the end user's consumption of electronic advertising information and provide user profile data to the metering server 14 relating to the end user. For example, the metering process 36 may monitor the amount of time an end user spends viewing an electronic advertisement, or which particular advertisement or page of the advertisement was of interest to the end user. The metering process 36 may further monitor what answers were provided by the user, or paths taken by the user in an interactive model, along with follow-up requests initiated by the end user in an interactive model. This information is then forwarded to the clearinghouse server 20 for compilation.

Figure 5A:
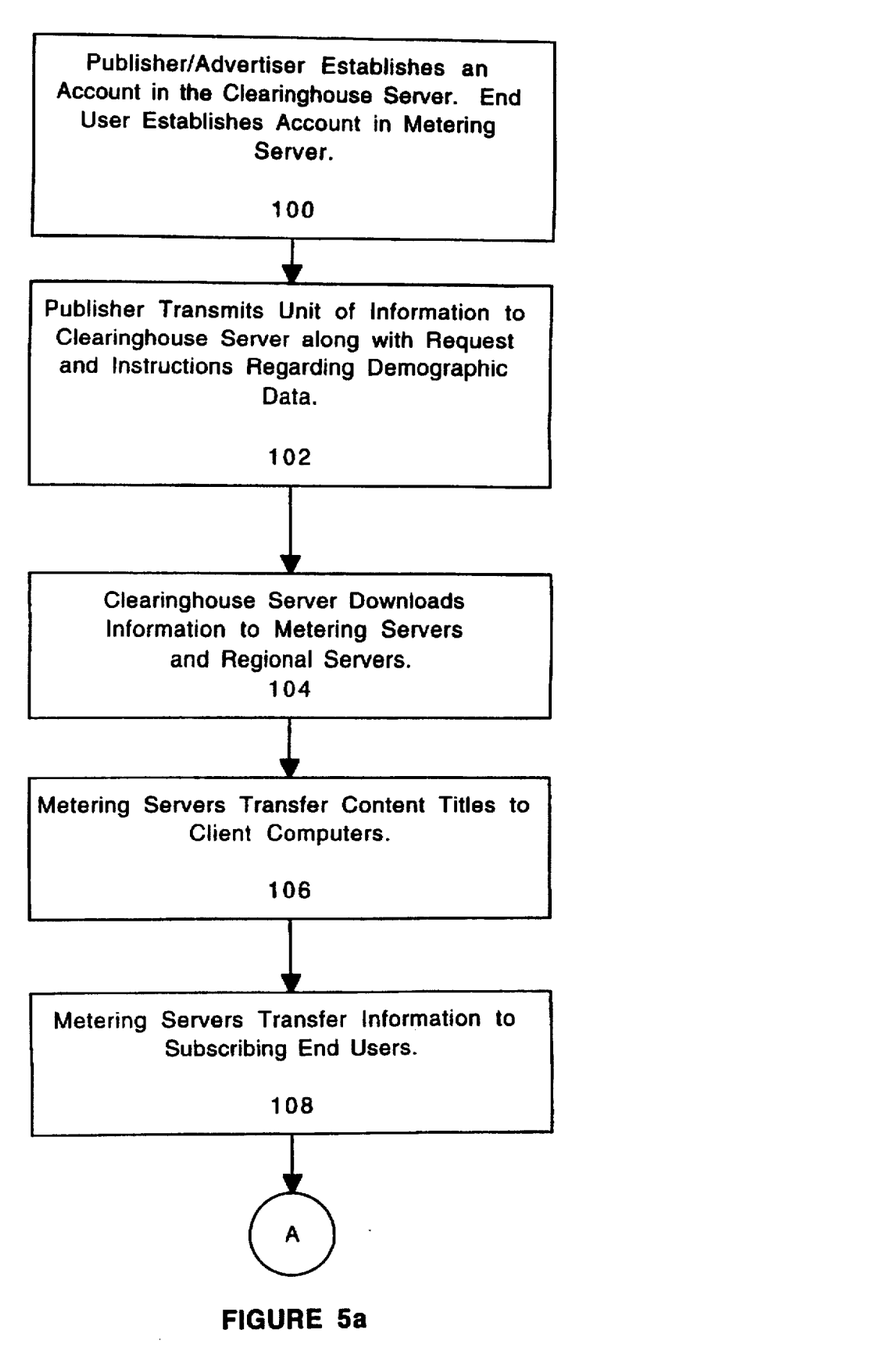
Figure 5C:
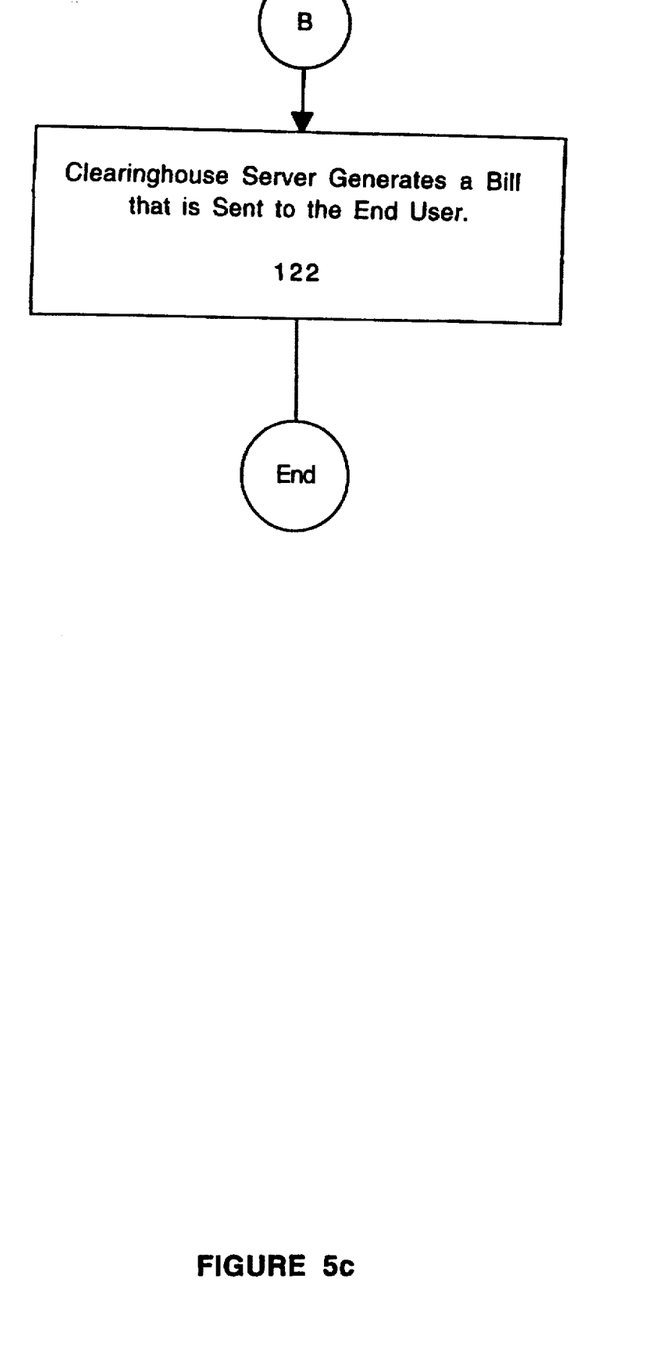

FIGS. 5a–c provide an example of a publisher supplying information that is consumed by the end user. As shown in processing block 100, both the end user and the publisher have established account numbers that are stored in the clearinghouse 20 and metering 14 servers. By way of example, the publisher may be a newspaper entity that has a content database which contains text, graphics and video. In block 102, the publisher 18 transfers a unit of electronic information relating to a news story to the clearinghouse server 20. The electronic information has an associated title that summarily describes the contents of the information. The unit of electronic information also contains a cost type and a cost value. In this example, the cost type includes both subscription and pay per view. The pay per view will have an associated cost value. The unit of information also requests profile data relating to the end users who consume the pay per view information. Additionally, the unit of electronic information provides target user profile data to direct the electronic information to end users who have correlating profile data.

In block 104, the clearinghouse server 20 downloads the unit of electronic information to the regional 21 and metering 14 servers which service end users that are subscribers or have qualifying profile data. In block 106, the metering servers 14 transfer the content titles to the client computers 12. For end users that are not subscribers, the metering server 14 may also provide an indication of the cost of viewing the information.

In block 108, the metering servers 14 transfer the contents of the information to end users that are subscribers. If the contents do not reside in the metering server 14, the contents are typically retrieved from the regional content database server 21. A non-subscribing end user may request consumption of the electronic information in block 110. In block 112, the metering server 14 determines if the price of viewing the information exceeds the balance of the user's account. In block 114 the end user's account is debited an amount equal to the price of viewing the information. If the account balance is not exceeded by the purchase of electronic information, the contents are transferred to the end user in block 116.

In block 118, the metering server 14 sends the profile data requested by the publisher 18 and the billing information to the clearinghouse server 20. The clearinghouse server 20 credits the publishers account and transfers the profile data to the publisher in block 120. In block 122, the clearinghouse server generates a bill that is sent to the end user.

Figure 6A:
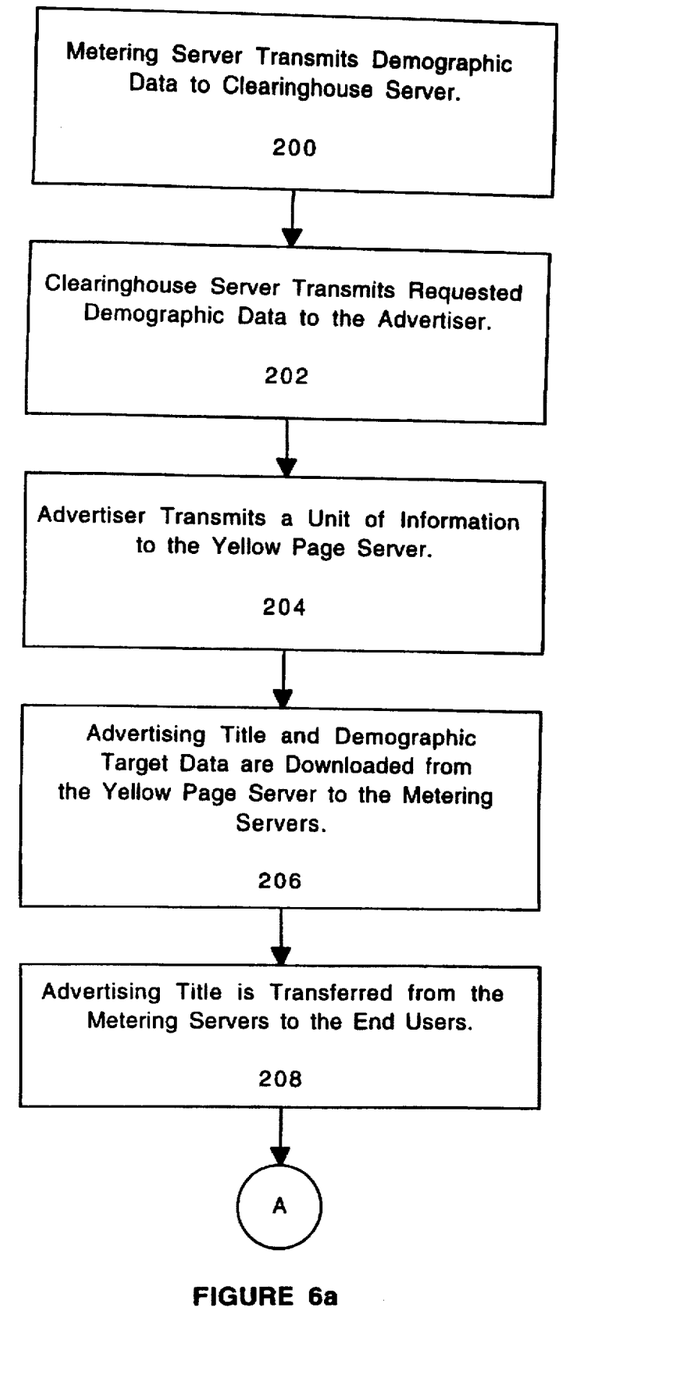
FIG. 6a-c are flow diagrams that show an electronic advertisement consumed by an end user.
Figure 6B:
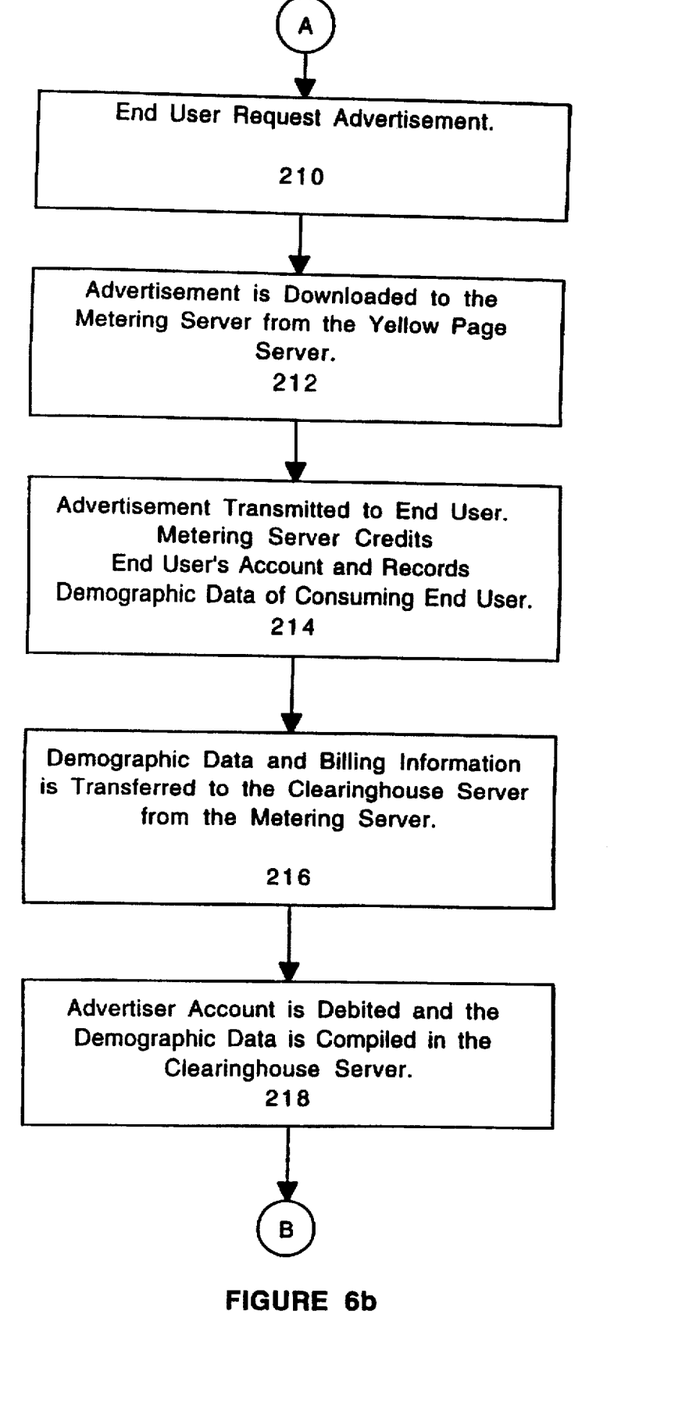
Figure 6C:
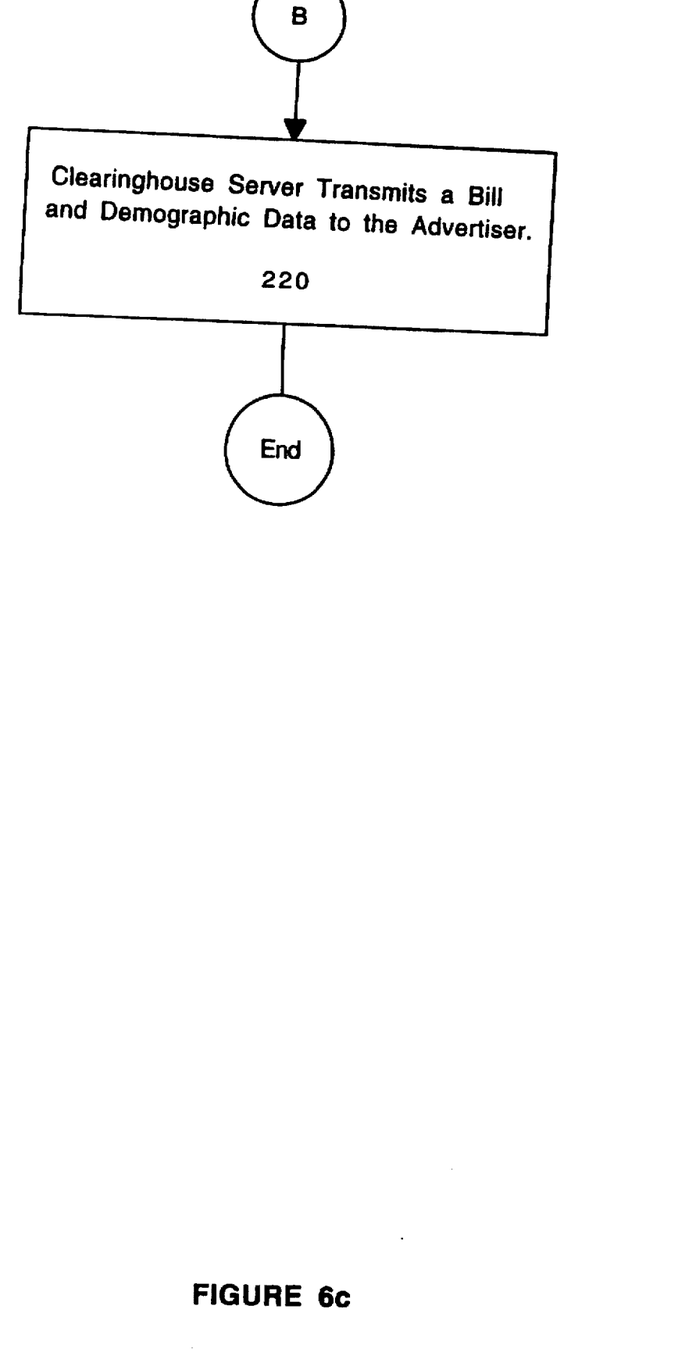

FIGS. 6a–c provide an example of an end user viewing an advertisement. In processing block 200, profile data of the end users is transferred from the metering server 14 to the clearinghouse server 20. The clearinghouse server 20 transmits requested profile data to the advertiser 18 in block 202.

In block 204, the advertiser 18 transmits a unit of information to the yellow page server 22. The unit of information contains an advertisement, advertisement title and user profile characteristics for targeting end users. The advertising title and profile target data are downloaded to the metering servers 14 by the yellow page server 22 in block 206. The metering servers 14 then provide the advertisement title to end users who have profile characteristics that correlate with the targeted profile data in block 208.

The end user requests the advertising information in block 210. In block 212, the metering server 14 requests the advertisement from the yellow page server 22, which downloads the advertisement information to the metering server 14. In block 214, the metering server 14 transfers the advertisement to the end user, credits the end users account and records the profile data of the end users who requested the advertisement.

In block 216, the profile data and billing information are transferred from the metering server 14 to the clearinghouse server 20. The profile data is compiled and the advertiser's account is debited in block 218. In block 222, the clearinghouse server 20 generates and provides the advertiser 18 with a bill and the profile data of the end users who viewed the advertisement.

What is thus provided is an architecture and scheme for transferring and monitoring the consumption of electronic information. The present invention allows a publisher/advertiser 18 to generate and electronically distribute information. The system also provides a means for automatically charging and billing for the consumption of the electronic information.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system that distributes electronic information, comprising:

an external device that transmits a unit of information which has a content data and a content title;

a plurality of client computers which receive said content title, said client computers each being operated by an end user which can request access to said content data; and a metering server that receives said unit of information transmitted by said external device, transfers said content title to said plurality of client computers of end users, and transfers said content data to a client computer of an end user that requests said content data.

2. The system as recited in claim 1, wherein said external device is a clearinghouse server which transmits said units of information.

3. The system as recited in claim 1, wherein said external device is a publisher/advertiser unit that generates and transmits said unit of information.

4. The system as recited in claim 1, wherein said external device is a yellow page server which stores and transmits said unit of information.

5. The system as recited in claim 1, wherein said unit of information includes an associated price and said metering server contains a transaction database that has a balance of an end user's account, said metering server further having a metering process that prevents said content data from being transferred to said client computers if said price exceeds said balance.

6. The system as recited in claim 5, wherein said price is associated with a cost type and a cost value.

7. The system as recited in claim 5, wherein said metering process debits said end user's account when said content data is transferred to said client computer.

8. The system as recited in claim 5, wherein said metering process credits said end user's account when said content data is transferred to said client computer.

9. The system as recited in claim 1, wherein said metering server includes a user profile database that contains demographic data of end users that reside within the system.

10. The system as recited in claim 1, wherein said metering server further includes a content database that contains one or more units of information.

11. A system that distributes electronic information, comprising:

a publisher/advertiser unit that generates and transmits a unit of information which has a content data and a content title;

a plurality of client computers which receive said content title, said client computers each being operated by an end user which can request access to said content data;

a metering server that receives said unit of information, transfers said content title to said plurality of client computers of said end users, and transfers said content data to said client computer of said end user that requests said content data; and a clearinghouse server which transfers said unit of information to said metering server.

12. The system as recited in claim 11, wherein said unit of information includes an associated price and said metering server contains a transaction database that has a balance of an end user's account, said metering server further having a metering process that prevents said content data from being transferred to said client computers if said price exceeds said balance.

13. The system as recited in claim 11, wherein said price is derived from a cost type and cost value generated by said publisher/advertiser unit.

14. The system as recited in claim 12, wherein said end user's account is transmitted from said metering server to said clearinghouse server.

15. The system as recited in claim 11, wherein said metering server includes a user profile database that contains demographic data of end users that reside within the system.

16. The system as recited in claim 15, wherein said metering server transmits the demographic data of the end users to said clearinghouse server.

17. The system as recited in claim 11, wherein said metering server includes a content database that contains one or more units of information.

18. The system as recited in claim 16, wherein said clearinghouse server has a response process that transmits the demographic data of the end users from said clearinghouse server to said publisher/advertiser unit.

19. The system as recited in claim 14, wherein said clearinghouse server contains a billing process that generates a bill.

20. The system as recited in claim 12, wherein said metering process debits said end user's account when said content data is transferred to said client computer.

21. The system as recited in claim 11, wherein said metering process credits said end user's account when said content data is transferred to said client computer.

22. A system that distributes electronic information, comprising:

external device means for transmitting a unit of information which has a content data and a content title;

a plurality of client computers which receive said content title, said client computers each being operated by an end user which can request access to said content data; and metering means for receiving said unit of information, transferring said content title to said plurality of client computers of said end users, and transferring said content data to said client computer of said end user that requests said content data.

23. The system as recited in claim 22, wherein said external device means is a clearinghouse means which transmits said unit of information.

24. The system as recited in claim 22, wherein said external device means is a publisher/advertiser means that generates and transmits said unit of information.

25. The system as recited in claim 22, wherein said external device means is a yellow page server means which stores and transmits said unit of information.

26. The system as recited in claim 22, wherein said unit of information includes an associated price and said metering means contains a transaction database that has a balance of an end user's account, said metering means further having a metering process that prevents said content data from being transferred to said client computers if said price exceeds said balance.

27. The system as recited in claim 26, wherein said price is associated with a cost type and a cost value.

28. The system as recited in claim 26, wherein said metering process debits said end user's account when said content data is transferred to said client computer.

29. The system as recited in claim 26, wherein said metering process credits said end user's account when said content data is transferred to said client computer.

30. The system as recited in claim 22, wherein said metering means includes a user profile database that contains demographic data of end users that reside within the system.

31. The system as recited in claim 22, wherein said metering means includes a content database that contains one or more units of information.

32. A system that distributes electronic information, comprising:

publisher/advertiser means for generating and transmitting a unit of information which has a content data and a content title;

a plurality of client computers which receive said content title, said client computers each being operated by an end user which can request access to said content data;

metering means for receiving said unit of information, transferring said content title to said plurality of client computers of said end users, and transferring said content data to said client computer of said end user that requests said content data; and clearinghouse means for transferring said unit of information from said publisher/advertiser means to said metering means.

33. The system as recited in claim 32, wherein said unit of information includes an associated price and said metering means contains a transaction database that has a balance of an end user's account, said metering means further having a metering process that prevents said content data from being transferred to said client computers if said price exceeds said balance.

34. The system as recited in claim 33, wherein said price is derived from a cost type and cost value generated by said publisher/advertiser means.

35. The system as recited in claim 33, wherein said end user's account is transmitted from said metering means to said clearinghouse means.

36. The system as recited in claim 32, wherein said metering means includes a user profile database that contains demographic data of end users that reside within the system.

37. The system as recited in claim 36, wherein said metering means transmits the demographic data of the end users to said clearinghouse means.

38. The system as recited in claim 32, wherein said metering means includes a content database that contains one or more units of information.

39. The system as recited in claim 37, wherein said clearinghouse means includes a response process that transmits the demographic data of the end users from said clearinghouse means to said publisher/advertiser means.

40. The system as recited in claim 35, wherein said clearinghouse means contains a billing process that generates a bill.

41. The system as recited in claim 33, wherein said metering process debits said end user's account when said content data is transferred to said client computer.

42. The system as recited in claim 33, wherein said metering process credits said end user's account when said content data is transferred to said client computer.

43. A method for distributing electronic information, comprising the steps of:
   a) generating a unit of information that has a content data and a content title;
   b) transmitting said unit of information from a publisher/advertiser to a metering server;
   c) transmitting said content title to a plurality of client computers, each being operated by an end user;
   d) requesting said content data by an end user; and,
   e) transmitting said content data to said client computer of said end user that requested said content data.

44. The method as recited in claim 43, further comprising the steps of associating a price with said unit of information, subtracting said price from a balance of an end user's account, and preventing said content data from being transferred to said client computer if said balance minus said price is not greater than zero.

45. The method as recited in claim 44, further comprising the steps of transferring said end user's account and balance and generating a bill.

46. The method as recited in claim 43, further comprising the steps of compiling demographic data of end users that operate said client computers and request said content data.

47. The method as recited in claim 43, further comprising the step of generating a unit of information with an associated cost type and cost value.

* * * * *